RESISTOR CIRCUIT NETWORK AND METHOD OF MAKING

Filed Oct. 6, 1966

United States Patent Office 3,422,386
Patented Jan. 14, 1969

3,422,386

RESISTOR CIRCUIT NETWORK AND METHOD OF MAKING

Walter Helgeland, Nashua, N.H., assignor to Sprague Electric Company, North Adams, Mass., a corporation of Massachusetts Filed Oct. 6, 1966, Ser. No. 584,892
U.S. Cl. 338—309 5 Claims
Int. Cl. H01c 7/00

ABSTRACT OF THE DISCLOSURE

Network having plurality of resistors on an elongated support is symmetrically disposed so that it can be inserted in a circuit by merely orienting the axis of the support, regardless of whether the support is turned end for end. Radially symmetrical network terminals can be screened on and overlapped by resistive coating from which individual resistors can be machined as by electron beam. Further machining adjusts resistors to desired values.

The present invention relates to electric circuit networks and particularly those constructed of thin films of conductive and/or resistive material carried by a suitable support.

Among the objects of the present invention are novel circuit networks of the foregoing type which are particularly suited for simple installation in a circuit.

Additional objects of the present invention include the provision of novel techniques for making the foregoing type of circuit networks.

The above as well as additional objects of the present invention will be more fully understood from the following description of several of its exemplifications, reference being made to the accompanying drawings wherein.

Figure 1:
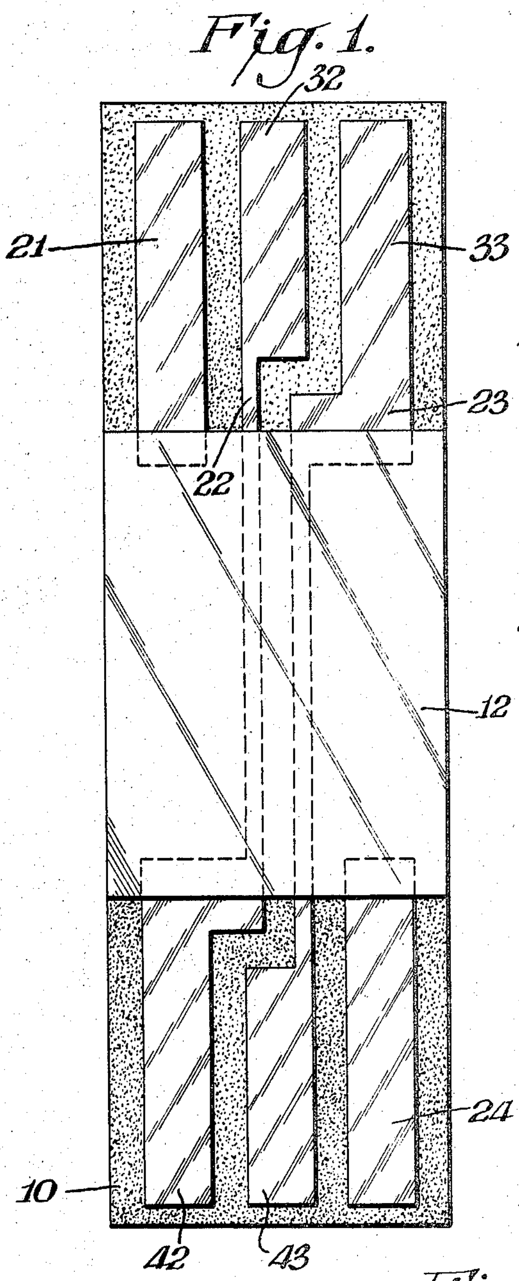
FIG. 1 is an enlarged plan view of a circuit network typical of the present invention in an early stage of its production.

According to the present invention an electrc circuit network is carried by an elongated support sheet and includes a plurality of circuit elements along with leads at opposite end zones of the sheet for insertion in a circuit, the network being electrically symmetrical and the leads being arranged and connected in a radially symmetrical manner so that the sheet can be inserted in a circuit with its elongated axis oriented in a predetermined direction regardless of whether the sheet is turned end for end.

The network can merely be a plurality of resistors or capacitors or a combination of both types of elements. Inductors can also be present in place of or in addition to the foregoing elements although for miniaturized networks inductors are generally not suitable except for ultrahigh frequency operation. An all-resistor network is the preferred form of the invention and can, for example, have a first resistor with a terminal at the one corner zone of the support sheet, a second resistor symmetrical with the first has a terminal at the diagonally opposite corner zone of the sheet and every intermediate terminal between the resistors is duplicated at each end zone of the sheet.

It is diserable to have all the network elements formed of spaced sections of the same coating. Thus all the resistors in a resistor network can be spaced sections of the same coating and can have intermediate terminals extending from one end zone of the sheet on which the coatings are carried to the other end zone in direct contact with portions of the coating so as to interconnect some of the resistors. Such resistors can be crowded together but spaced longitudinally-extending sections of the same coating with conductive coatings extending along opposed longitudinally extending edge zones of some of the sections and conductive coatings also extending along opposed longitudinal end zones of some of the sections. The last-mentioned conductive coatings can also provide terminals at opposite end zones of the sheet.

The electric circuit networks of the present invention are desirably made by providing a support that carries an electric circuit coating, severing the coating into a plurality of sections by removing elongated narrow parallel strips of the coating, and automatically adjusting each section by removing additional narrow strips parallel to the first-mentioned strips until the sections have their predetermined circuit values. The removed strips need not be more than about 3 mils wide and such strip removal is preferably effected by electron beam machining.

A very effective manufacturing technique is to have the circuit coating as an electrically resistive coating, for example, and to also have an electrically conductive terminal coating that overlaps the resistive coating and provides leads for the completed resistors. The support can be of elongated shape, the resistive coating on the central portion of the support, terminal coatings extending to both end portions of the support, the severed resistor sections as well as the terminal coatings being symmetrical so that the support can be inserted in a circuit with its longitudinal axis oriented in a predetermined direction regardless of whether the sheet is turned end for end. In such a combination conductive coating portions can extend laterally between resistive sections with the machining arranged so as not to completely cut through the lateral extension.

Also longitudinally extending conductive coating portions can overlap the resistive coating from one longitudinal end zone of the resistive coating to the other, the strip removal removing the resistive coating immediately adjacent such a longitudinally extending conductive portion leaving said portion as a terminal for only one of the severed sections.

Figure 2:
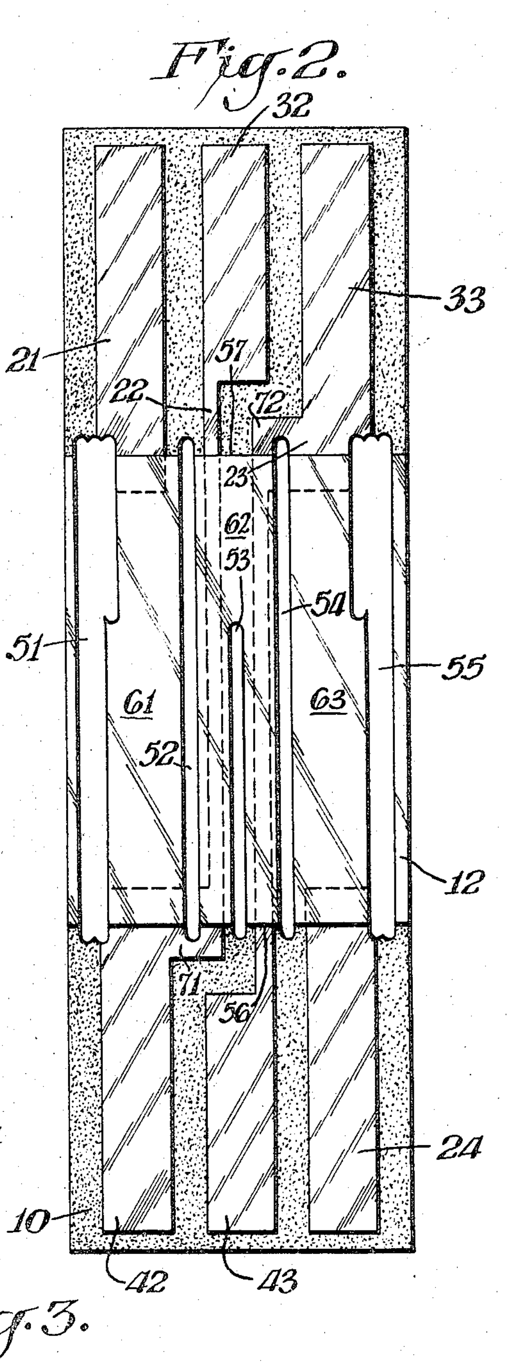
FIG. 2 is a view similar to FIG. 1 of the same network after all its parameters have been adjusted.
Figure 3:
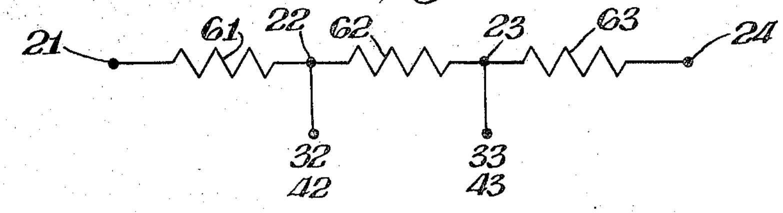
FIG. 3 is a circuit diagram of the network of FIG. 2.

Turning now to the drawings, FIGS. 1 and 2 show stages of the manufacture of a three-resistor electric circuit network according to the present invention, the network itself being schematically illustrated in FIG. 3. The manufacture begins with a support sheet 10 of ceramic of other non-electrically conductive material. The sheet is shown as elongated in shape and provided with an electrically resistive coating 12 as well as electrically conductive coating segments 21, 22, 23 and 24. Resistive coatings 12 is placed across the central portion of sheet 10 and the conductive coating segments are principally in the end zones of the sheet although each conductive segment overlaps the resistive coating. Segments 21, 24 are confined to their respective end zones near opposite corners of the sheet but segments 22, 23 extend from one end zone to the other. It will be noted, for example that segment 22 has a terminal portion 32 in one end zone and another terminal portion 42 in the opposite end zone. Similarly, segment 23 has opposed terminal portions 33 and 43. Terminal portion 32 is located in a radially symmetrical manner with respect to terminal portion 43, and similarly terminal portion 33 is located radially symmetrically with respect to terminal portion 42.

The foregoing combination of coatings is conveniently supplied by first applying the conductive coating segments as by silk screening a platinum gold alloy (half and half by weight) with a suitable binder such as powdered glass, and suitably dispersed in an aqueous vehicle. This silk screen coating is then fired and a chromium nickel (80% nickel by weight) layer then vacuum evaporated over the central portion of the sheet. Masking can be provided to define the longitudinal elements of the evaporated coating, but this is not essential since the longitudinal edges of the resistive coating can be ragged and can taper off gradually in thickness.

In one convenient embodiment sheet 10 can be ¾ inch long and ¼ inch wide so that the overall size is fairly small.

After the coating combination of FIG. 1 is supplied the sheet is subjected to a machining operation that cuts through the coatings, as illustrated at 51, 52, 53, 55 and 55 in FIG. 2. In the miniature sizes this machining is best performed by an electron beam technique as described, for example, in U.S. patent applications Ser. No. 506,426 filed Oct. 20, 1965 now Patent 3,293,587 granted Dec. 20, 1966, and Ser. No. 544,731 filed Apr. 25, 1966. The electron beam machining will machine out strips that are exceedingly narrow. A 3 mil width machining groove is particularly suited for the resistor combination of FIG. 2.

To enable a very rapid machining operation strip 52 can be machined first after which strip 51 is machined. During at least the latter machining, terminals 21 and 42 are connected in a measuring circuit as described in Ser. No. 544,731, and strip 51 is cut as a succession of machining passes that are automatically terminated when the resistance between leads 21 and 42 shows that the desired resistance value has been reached. It will be noted that FIG. 2 shows slightly less than 2½ such machining passes.

Strip 54 is then machined, followed by strip 55 which latter is machined in the same way 51 is. The resistance between terminals 23 and 24 is accordingly also automatically adjusted.

The machining of strip 52 cuts completely across the entire length of resistive coating 12 so that it leaves an isolated resistive segment 61, which segment provides the resistance between terminals 21 and 42. The machined-out strip 52, however, does not cut completely across a transversely extending section 71 of terminal 42. Section 71 accordingly continues to connect terminal 42 with the remainder of conductive coating segment 22 and with terminal 32 at its other end.

In the same way the machining of strip 54 is arranged so as to leave a transversely extending connection 72 from terminal 33 to the main body of terminal coating 23 and to the terminal 43 at its other end. The removal of strip 54 also isolates another segment 63 from the resistive coating 12.

The final machining is that of strip 53. This machining extends from one longitudinal end 56 of the resistive coating 12 but does not reach the opposite longitudinal end 57. It falls short of end 57 to leave an electrically resistive segment 62 which is the resistive component of a resistor that extends from conductive coating segment 22 to conductive coating segment 23. The resulting resistive combination is schematically shown in FIG. 3.

The circuit network of FIG. 2 is radially symmetrical so that the sheet 10 can be inserted in its circuit whether or not it is turned end for end. Resistors 61 and 63 are of equal resistance value and leads can be soldered to the terminals in either or both end zones of the sheet, or the sheet can be inserted under spring clip connectors or the like, arranged to securely engage the proper terminals. Regardless of the orientation of the sheet, connections will be electrically the same. Thus, a connection between terminals 21 and 32 will have the same electrical effect as a connection between terminals 24 and 33 when the sheet is turned end for end. In the same way, a connection between terminals 32 and 33 will have the same electrical effect as a connection between terminals 43 and 42 when the sheet is turned end for end. Even a connection between terminals 21 and 33 will similarly be the same as a connection between terminals 24 and 42. Cross connections, as between terminals 21 and 43 will also be the same as a cross connection between terminals 24 and 32.

The machining of the various strips need not extend to the very edges 56, 57 of the electrically resistive coating 12. As long as strips 51 and 55 extend to a point over the terminals that are overlapped by the resistive segments they cut through, this is all that is needed to provide the desired results. Any further excursions of the machining do not significantly affect the resistors that are formed. The same condition applies to the machining of strip 52 in the direction of edge 56 and the machining of strip 54 in the direction of edge 57.

On the other hand, the machining of strip 52 towards edge 57 is preferably made complete. Falling short of that edge would leave a little extra resistive path between terminals 21 and 32 which is in parallel with the main resistive path between terminals 21 and 42. Inasmuch as the extra parallel path is much shorter than the principal path, it may under some conditions detract from the suitability of the other path. For the same reason it is preferred to have the machining of strip 54 extend at least to the very edge 56 of resistive coating 12.

The machining of strip 53 can fall quite short of edge 56 just as it falls short of edge 57. The principal resistance here involved is in a path between conductive coating segments 22 and 23, and the circuit path between them through resistive coating 12 is the same whether this path is off one end of strip 53 as it is when it is off the other end, in the event this strip falls short of both edges. The overall resistance here involved is accordingly not significantly affected by such a modification.

On the other hand, the sweep of an electron beam or any other machining device is most conveniently controlled if it starts and ends all or nearly all sweep strokes in the same scanning positions. It is accordingly more practical to do the machining in the manner indicated in FIG. 2. If desired, however, the resistance adjustments for segments 61 and 63 can be made by additional machining strips contiguous with strips 52, 54 respectively. These strips will then be somewhat wider than is shown and generally have the shape indicated at 51, 55. For such a modification strips 51, 55 can each be merely a single pass of an electron beam or the like, and extremely narrow. Indeed, these strips can be entirely omitted so that segments 61, 63 extend to the very side margins of resistive coating 12. These side margins may be somewhat erratic in production, particularly where sheet 10 has rounded sides. So long as any variations in these side margins do not make it possible to improperly adjust the resistance by the machining of strips 52, 54, nothing significant is sacrificed by the omission of strips 51, 55.

It should be noted that the sheet 10 is preferably provided with rounded side edges inasmuch as this gives a somewhat better product. The sheets can then be extruded from a green ceramic dough in uncured condition through an extruding die shaped to have the round sides. The extruded green ceramic is more appropriately severed into individual lengths by a severing stroke that leaves a rectangular edge at the longitudinal ends of sheet 10. With such a construction a sheet only about $\frac{1}{16}$ of an inch thick provides very adequate support for the circuit network and can be subjected to considerable handling and rough treatment without much danger from chipping or breakage.

The circuit network of the present invention can have capacitive elements in place of some or all of the resistive elements 61, 62, 63. Thus by extending machined strip 53 so that it goes completely across coating 12 from one end 56 to the other end 57, terminal coating segments 22 and 23 will then have a capacitive interlinkage by reason of the close spacing of the adjacent edges of coating 62. In such a modification machined strip 53 can be made relatively narrow, as for example 1 mil wide, so as to bring the capacitively linked edges closer together and thereby provide greater capacitance. The capacitance can also be adjusted manually or automatically as by a second pass of an electron beam contiguous with the strip 53 made by the first pass, the second pass terminating at a point at which the capacitance reaches the correct value. The capacitance can be measured during the machining so that automatic termination of the machining is readily accomplished as in the manner described in Ser. No. 544,731.

For most purposes resistance coatings 12 are made thin, as for example 2 microns thick, and the capacitive linkage between the edges of such a thin coating is of fairly high magnitude. On the other hand, for many purposes it is preferred to have a capacitance with very high conductivity between the capacitor electrodes and their respective connection terminals, in which event it is better to have coating 62 made much thicker or of an electrically conductive composition, or both. Segment 62 can accordingly be a portion of the electrically conductive coating and the resistive coating 12 can be omitted from this location. It does not hurt, however, to apply electrically resistive coating 12 over the electrically conductive coating at location 62, and this can be done to simplify the application of the electrically resistive coating.

Coating segments 61, 63 can also be arranged to provide capacitances in the same manner as segment 62 as by reshaping their terminals so that they are in the form shown for conductive coating segments 22, 23, and machining an interelectrode gap between them.

Obviously many modifications and variations of the present invention are possible in the light of the above teachings. For example, strip 53 can be machined first if it is used to provide a resistance or capacitance, although it is preferred to provide such a resistance after strips 52 and 54 are machined. Also the electron beam machining or other machining can be used to provide the terminal connectors by isolating them from a larger electrically conductive layer before or after the electrically resistive layer is applied. It is, therefore, to be understood that within the scope of the appended claims the invention may be practiced otherwise than as specifically described.

What is claimed:

1. An electric circuit network having a plurality of resistors in the form of substantially rectangular electrically resistive coatings on an elongated rectangular support sheet, electrically conductive terminal coatings on the support sheet and contacting opposite ends of end resistor coating, the network being electrically symmetrical and the terminal coatings extending toward the opposite ends of the support sheet in a radially symmetrical relation so that the support sheet can be inserted in a circuit with its elongated axis oriented in a predetermined direction regardless of whether the support is turned end for end.

2. The combination of claim 1 in which a first resistor has a terminal extending to one corner zone of the support sheet, a second resistor symmetrical with the first has a terminal at the diagonally opposite corner zone of the sheet and every intermediate terminal between the resistors is duplicated at each end zone of the sheet.

3. The combination of claim 1 in which the network has three resistors, all crowded together, spaced, longitudinally-extending sections of the same resistive coating, conductive coatings extend along opposed longitudinally extending edge zones of the sections, and conductive coatings extend along opposed longitudinal end zones of the sections.

4. The combination of claim 3 in which conductive coatings that extend along longitudinally extending edge zones also connect terminals at opposite end zones of the sheet.

5. A method for manufacturing a compact symmetrical assembly of three resistors one of which has a different resistance than the other two, which method includes the steps of providing an elongated rectangular support that carries an electrically resistive coating extending transversely across the width of the support and overlapping an electrically conductive terminal connection pattern coating having terminal portions at both ends of the support and two terminal portions extending adjacent each other longitudinally across the resistive coating, machining longitudinally across the resistive coating outside said two terminal portions to sever the resistive coating into three sections one for each of the respective resistors, and machining a longitudinal gap in the section overlapping the longitudinally extending terminal portions to partially cut through said section and adjust its resistance.

References Cited

UNITED STATES PATENTS

| | | | |
|---|---|---|---|
| 2,629,166 | 2/1953 | Marsten | 338—325 X |
| 2,758,256 | 8/1956 | Eisler | 338—309 X |
| 2,994,848 | 8/1961 | Rayburn | 338—308 X |
| 3,330,696 | 7/1967 | Ullery. | |

LEWIS H. MYERS, *Primary Examiner.*

ELLIOT GOLDBERG, *Assistant Examiner.*

U.S. Cl. X.R.

338—325, 320; 29—620, 593